United States Patent [19]

Ikenoue

[11] Patent Number: 5,255,031
[45] Date of Patent: Oct. 19, 1993

[54] DATA-RETAINABLE PHOTOGRAPHIC FILM CARTRIDGE

[75] Inventor: Shinpei Ikenoue, Minami-Ashigara, Japan

[73] Assignee: Fuji Photo Film Co., Ltd., Kanagawa, Japan

[21] Appl. No.: 979,454

[22] Filed: Nov. 20, 1992

Related U.S. Application Data

[63] Continuation of Ser. No. 821,292, Jan. 10, 1992, abandoned, which is a continuation of Ser. No. 600,937, Oct. 22, 1990, abandoned.

[30] Foreign Application Priority Data

Nov. 13, 1989 [JP] Japan .............. 1-131872[U]

[51] Int. Cl.$^5$ .............................. G03B 17/24
[52] U.S. Cl. ............................ 354/106; 355/40
[58] Field of Search ............. 354/75, 76, 105, 106, 354/107, 108, 275, 21; 355/40, 41

[56] References Cited

U.S. PATENT DOCUMENTS

| | | | |
|---|---|---|---|
| 4,173,401 | 11/1979 | Harvey | 354/21 |
| 4,302,523 | 11/1981 | Audran et al. | 430/140 |
| 4,437,742 | 3/1984 | Taniguchi | 354/21 |
| 4,453,814 | 6/1984 | Satoh et al. | 354/107 |
| 4,490,027 | 12/1984 | Frank et al. | 354/21 |
| 4,500,183 | 2/1985 | Tanikawa | 354/21 |
| 4,655,570 | 4/1987 | Jaffe | 354/107 |
| 4,728,978 | 3/1988 | Inoue et al. | 354/106 X |
| 4,860,037 | 8/1989 | Harvey | 354/21 |
| 4,864,332 | 9/1989 | Harvey | 354/21 |
| 4,974,096 | 11/1990 | Wash | 354/21 X |

FOREIGN PATENT DOCUMENTS

| | | |
|---|---|---|
| 0341077 | 5/1989 | European Pat. Off. |
| 0342627 | 5/1989 | European Pat. Off. |
| 357355 | 8/1989 | European Pat. Off. |
| 0357355 | 3/1990 | European Pat. Off. |
| 58-182621 | 10/1983 | Japan |
| 62-116932 | 10/1987 | Japan |
| 2141096 | 5/1984 | United Kingdom |

Primary Examiner—Michael L. Gellner
Assistant Examiner—Howard B. Blankenship
Attorney, Agent, or Firm—Sughrue, Mion, Zinn, Macpeak & Seas

[57] ABSTRACT

The present invention provides a photographic film cartridge including a cartridge, a spool carried in the cartridge for rotation about a longitudinal axis of the spool, a film wound into a roll around the spool, the film having frames each of which has an area to be exposed larger than 350 mm$^2$ but smaller than 1200 mm$^2$, an optical data-input region formed in the film having an area larger than 15% of the area of the frame, and at least one of electrical data-input device and magnetic data-input device being formed in the film or the cartridge.

12 Claims, 2 Drawing Sheets

DATA-RETAINABLE PHOTOGRAPHIC FILM CARTRIDGE

This is a Continuation of Application No. 07/821,292 filed Jan. 10, 1992, which is a continuation of application No. 07/600,937 filed Oct. 22, 1990, both now abandoned.

BACKGROUND OF THE INVENTION

The present invention relates to a photographic film cartridge, and in particular to a cartridge which can record various kinds of data therein at suitable times.

RELATED ART STATEMENT

Hitherto, for the purpose of improving the image quality of photographs, optical, magnetic or electrical means have been used to input various kinds of data to a photographic film, such as data or the use of the electronic flash, the color temperature, LV value, object distance, focal length, contrast date and time of photography, site of photography, and so on. Also, data or the photographic film used including the kind of photographic film, the date the film was produced, conditions required when making prints, and data or the laboratory including the name of the laboratory, the date the film was developed, conditions required when performing simultaneous printing, and so on have been recorded.

For example, Japanese Kokai Nos. 62-50743 and 62-209430 and U.S. Pat. No. 4,864,332 disclose means for inputting such data to photographic films.

OBJECT AND SUMMARY OF THE INVENTION

However, conventional means for inputting data use only one of the above mentioned means: optical means, magnetic means or electrical-means. Thus, it is quite difficult for the conventional means to easily and definitely input various data as aforementioned onto a photographic film respectively when the film is being produced, when photographing is taking place, when the film is being developed, and when prints or reprints are being made.

It is therefore the object of the present invention to provide a photographic film cartridge which can input various kinds of data at the occasions as aforementioned.

According to the present invention, the above object can be accomplished by a photographic film cartridge unit comprising a cartridge; a spool carried in the cartridge for rotation about a longitudinal axis the spool; a film wound into a roll around, the film having frames each of which has an area to be exposed larger than 350 $mm^2$ but smaller than 1200 $mm^2$; an optical data-input region formed in the film having an area larger than 15% of the area of the frame; and at least one of electrical data-input means and magnetic data-input means formed in the film or the cartridge.

In a preferred embodiment, the optical data-input region is formed outside the area to be exposed at both edges of the film.

In another preferred embodiment, the electrical data-input means formed in the cartridge is a semiconductor element.

In still another preferred embodiment, the cartridge is provided with magnetic data-input means.

In another preferred embodiment, the film is provided with magnetic data-input means.

In this specification, the optical data-input region is the region to which data is input by means of an LED, for instance, utilizing the photosensitivity of the film. Since all areas of the film are photosensitive all areas except the except frames can be used as the optical data-input region. The area of the optical data-input region can be increased by reducing the number of perforations formed in 135 format film. The amount of data input to the film can be increased if the film is a color film by inputting data to the film using more than two light sources emitting light of different colors. Data can be input to both front and reverse surfaces of the film. Preferably, data is input to the front surface of the film. In addition, data can be input to the film at any time before the film is developed. Preferably, data is input to the film, in the process of making the film or while in the camera. Preferably, the amount of light used to input data to the film is adjusted in accordance with the degree of the photosensitivity.

It is necessary for the frame to have an area larger than 350 $mm^2$ so as to keep the image quality of the prints good. Preferably, the frame should have an area larger than 350 $mm^2$ but smaller than 1200 $mm^2$ since the area of the optical data-input region decreases if the area of the frame is over 1200 $mm^2$. Preferably, the film should have a width of 35 mm in compliance with the present laboratory system.

Conventionally, data or the production of the film has often been input to the film in the form of a bar code on the area outside of the perforations formed at both edges of the film. However, in the case where various kinds of data as well as production data are to be input in the form of a bar code on the film, in the conventional method where data is input only in one row on both edges of the film, not enough space for all the data can be provided. Two rows are necessary for data-input space on at least one edge of the film. To this end, it is necessary to increase the ratio of the area of the optical data-input region relative to the area of the frame from 11% to 15%. The ratio of the area of the optical data-input region relative to the area of the frame is now 11%. When data-input methods other than the bar code are adapted, there is little difference in data density between the bar code and other methods, so a similar ratio of the optical data-input region relative to the area of the frame is required.

On the other hand, since it is desired that the area of the frame remain large, the preferable upper limit of the ratio of the area of the optical data-input region relative to the area of the frame is determined in due consideration of the above. The upper limit is preferably 30%, and more preferably, 20%.

Alternatively, the area of the optical data-input region can be increased without decreasing the area of the frame by deleting or decreasing the number of perforations of film having a width of 35 mm. In this alternative arrangement, it is preferable to form one to four perforations or notches per frame only for locating the film instead of conventional perforations. It is more preferable to form one perforation or notch per frame. The intervals between the perforations or notches are preferably longer than 20 mm but shorter than 42 mm.

In this specification, the ratio of the area of the optical data-input region relative to the area of the frame is defined as follows. As shown in FIG. 1, assuming that the longitudinal length of the frame is "a" the vertical length of the frame is "b" and the width of the film is "c" the area A of the frame, the area B of the region to be exposed and the area C of the optical data-input region are defined as follows.

$$A = a \times c$$

$$B = a \times b$$

$$C = A - B = a \times (c - b)$$

Accordingly, the ratio R of the optical data-input region relative to the frame is defined as follows.

$$R = C/A = (A - B)/A = (c - b)/c$$

In the photographic film cartridge in accordance with the present invention, the optical data-input region is preferably formed outside the area to be exposed at the edges of the film. This is because forming the optical data-input region between the areas to be exposed results in the elongation of the length of the film, which is not advantageous for manufacturing a thinner camera. Furthermore, if the optical data-input regions are formed between the perforations, a quite complex camera structure is required when inputting data to the optical data-input regions and reading data from the same. For these reasons, the optical data-input regions are not formed between the areas to be exposed or between the perforations, but formed outside the areas to be exposed.

Data in the form of letters is preferably input to the film in the form of letters or bar codes.

Preferably, optical data-input means utilizing the photographic sensitivity of the film is used to input various data which are to be input when the film is produced or when taking photographs to simplify the process of manufacturing the film, miniaturize the camera and reduce costs. However, magnetic data-input means or electrical data-input means are preferably used when enputting or reading data representing the state of a film, such as whether it is or is not being used, the number of frames used and so on, since it is then unnecessary to develop the film. In addition, magnetic data-input means or electrical data-input means are preferably used when various kinds of data are input in a laboratory since additional data can be input after developing the film.

In general, the optical data-input means is suitable for inputting data when taking photographs and the magnetic data-input means is suitable for doing the same after developing the film. For instance, it is necessary to keep the relative speeds between a film and a magnetic head constant in order to magnetically input data to a film when taking photographs. Furthermore, a circuit or a contact for the semiconductor element are required to input data electrically to a seminconductor element. The camera is required to have a complex structure for accomplishing the above. Accordingly, the optical data-input means is suitable for inputting data when taking photographs because of its reliability and simplicity.

On the other hand, magnetic data-input means or electrical data-input means are necessarily used after developing the film since optical data-input means utilizing photographic sensitivity can so longer be used.

For instance, data are input to the film at a laboratory before developing the film, such as the name of the aboratory, the date of developing the film and the number of prints, and data are input to the film at a laboratory after developing the film, such as the conditions required when prints are made, the printer, the number of prints and the conditions for trimming.

The semiconductor element used as an electrical storage means is preferably an EEPROM, for instance. Though such semiconductor element is preferably attached to the body of a cartridge, the cartridge and the semiconductor element may be separately mounted in the camera. An IC card including a microprocessor and EEPROM may be used as an electrical data-input means.

A transparent magnetic base disclosed in U.S. Pat. Nos. 4,302,523, 3,782,947 and 4,279,945 is preferably used as magnetic data-storage means. The transparent magnetic base has two advantages; one is that data concerning a specific frame can be input at the position adjacent to the frame, the other is that the optical data-input region can also be used as the magnetic data-input region. The magnetic data-input region may be formed only outside the area to be exposed. In this arrangement the magnetic data-input region may be opaque.

In a cartridge provided with magnetic data-input means, data concerning the DX code and the state of a film can be input to or output from the magnetic data-input means. Data concerning the consumption of the film which is input in cartridge form can be advantageously confirmed without taking the film out of the camera. There are many ways to couple magnetic data-input means with a cartridge, such as by attaching magnetic tape to a cartridge, using a cartridge made of polymer with magnetic material distributed therein to provide a cartridge with a magnetically data-input function, and printing a cartridge with an ink in which magnetic material is distributed.

A light-tight type cartridge such as disclosed in Japanese Utility Model Application No. 1-17253 is preferably used to prevent data input by means of optical data-input means from being eliminated because of light leakage.

The above object and advantageous features of the present invention will be made apparent from the following explanation made with reference to the accompanying drawings.

DESCRIPTION OF THE PREFERRED EMBODIMENTS

Figure 1:
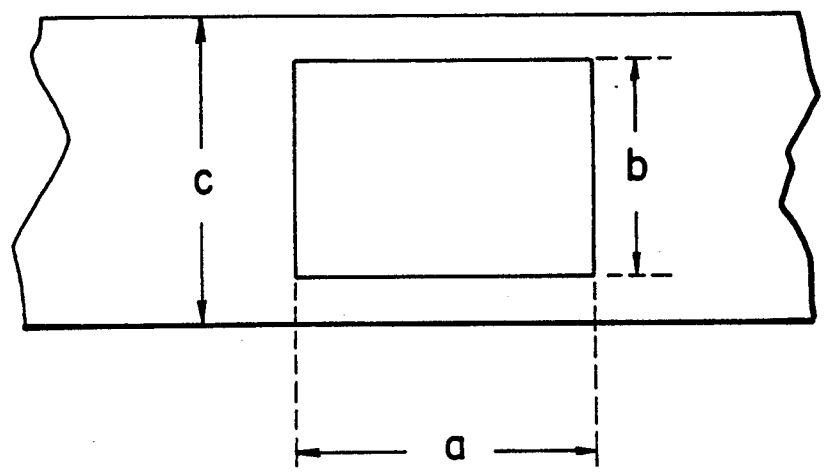
FIG. 1 is a plan view illustrating areas of optical data-input region and area to be exposed.
Figure 2:
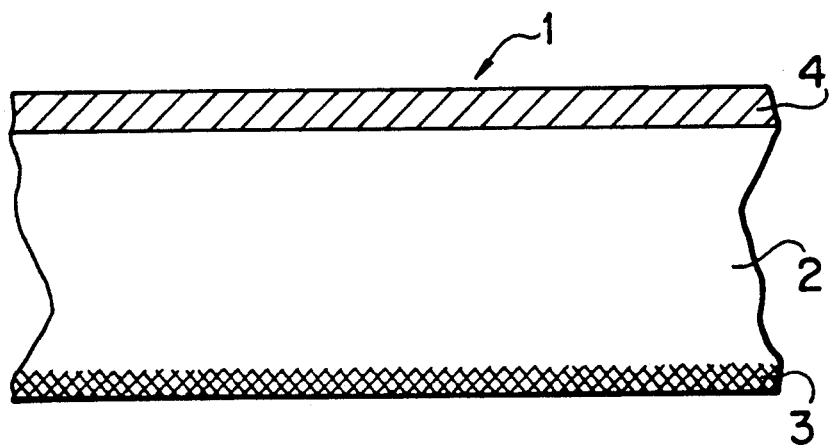
FIG. 2 is a cross-sectional view of the film in accordance with the invention.
Figure 3:
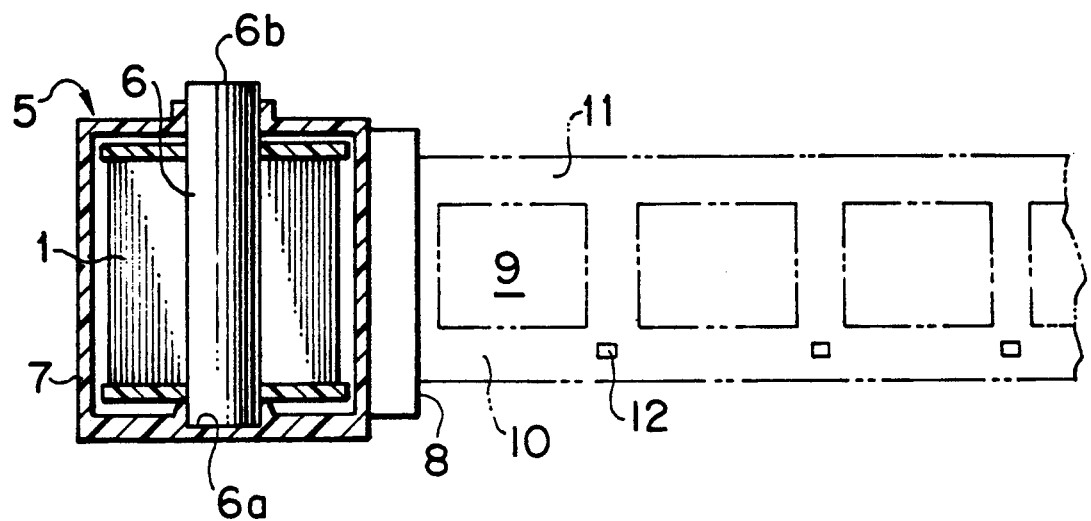
FIG. 3 is a cross-sectional view of the cartridge in accordance with the invention.

FIGS. 2 and 3 illustrate a film to be housed in a cartridge according to the invention. As showin in FIG. 2, a base 2 of a film 1 is 122 $\mu$ in thickness. The base 2 is a cellulose triacetate base, the reverse surface of which is coated with a magnetic material ($\gamma$- $Fe_2O_3$) 3 at the rate of 0.1 gram per square meter (Refer to Japanese Patent Publication No. 57-6576).

A sensitive layer 4 is formed for the use of nega color film having a 400 ASA, value on the upper surface of the base 2, which layer contains silver at the rate of approximately 7 grams per square meter (Refer to Japanese Patent Public Disclosure No. 63-236035).

FIG. 3 shows the film 1 housed in a photographic film cartridge 5. The film cartridge 5 includes a spool 6 and a cartridge case 7. The spool 6 is carried at its one end 6a in the cartridge case 7 for rotation about a longitudinal axis of the spool 6 and at its opposite end 6b so that the spool 6 can be rotated from the outside of the cartridge case 7. The film 1 is wound into a roll around the spool 6. The cartridge case 7 is provided with an outlet opening 8 for pulling the film 1 out of the cartridge case 7. The film 1 includes an area 9 to be exposed, an optical data-input region 10, an optical and magnetic data-input region 11 and perforations 12 for locating a frame of the film 1. The optical data-input region 10 is the region to which data is input by means of optical data-input means utilizing the sensitivity of the film 1.

Using the film I housed in the cartridge 5, the inputting of various kinds of data and the making of prints on the basis of the data are accomplished as follows:

1. Such data as the DX code and the date of producing the film are input to the optical and magnetic data-input region 11 when processing the film. The data is input in the form of letters or bar codes.
2. Such data as the date of photography the, presence of electronic flash and trimming information for psuedo-zoom are input to the optical data-input region 10 in the form of a bar code using an LED provided with in the camera.
3. Conditions for making prints are automatically set and adjust a changes in the film after the passage of time on the basis of data such as the date of producing the film, the date of photography and the date of development. Such setting conditions are automatically accomplished by means of a program set in advance within an automatic printer. This reduces deterioration in the quality of the printing to a minimum due to changes in the film with passage of time.
4. When an electronic flash, has been used adjustment is automatically made to add yellow color to prints in accordance with the program set in the automatic printer. This causes an adjustment of color, which is conventionally manually done, to be done automatically with the result that there is a decrease in color scattering in photographs taken with an electronic flash.
5. The automatic printer automatically accomplishes trimming when making prints in accordance with pseudo-zoom data. Even when trimming is accomplished, the date of photography is printed on the lower corners of the prints. Thus, pseudo-zoom prints can be made automatically instead of manually and the date can be printed or the pseudo-zoom prints.
6. In a laboratory, conditions for making print as set forth in No. 3 and those adjusted for each frame are input magnetically to the optical plus magnetic data-input region 11. This reduces the change in color in the case of developing as well as printings or in the case of second printing.
7. At an film developing shop, such data as the number of prints in a second printing and the conditions for trimming are input to the optical and magnetic data-input region 11. This increases the efficiency of second printings at a laboratory.

As described above, the provision of the optical data-input means and the magnetic data-input means makes it possible to input various kinds of data not only when photographing but also after developing, so that the quality of prints can be improved.

Figure 4:
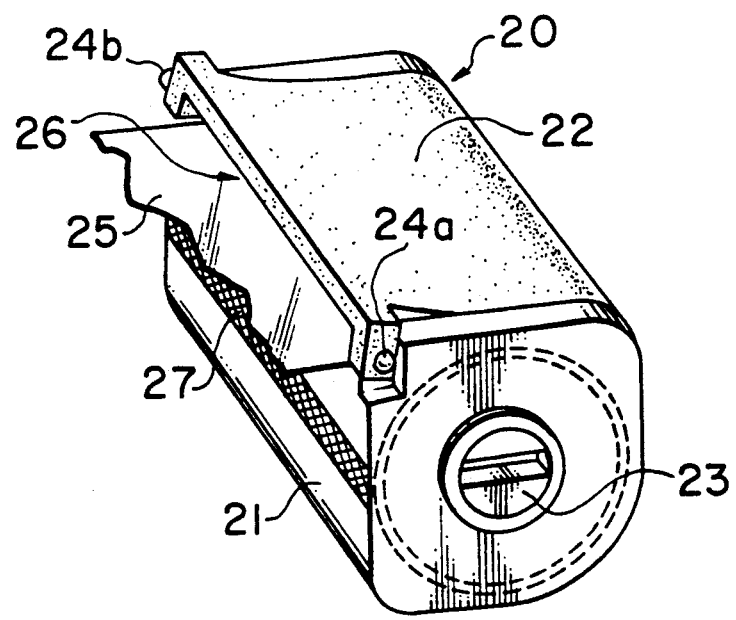
FIG. 4 is a perspective view of another type of cartridge in accordance with the invention.

Another embodiment of a photographic film cartridge according to the present invention is shown in FIG. 4. A cartridge 20 includes a cartridge case 21, a flexible wall portion 22 secured at its one edge to the cartridge case 21 and a spool 23 carried in the cartridge case 21 for rotation about a longitudinal axis thereof. The flexible wall portion 22 is provided at opposite ends with a pair of projections 24a, 24b which engage a cover-opening mechanism of a camera. A film 25 is tightly wound into a roll around the spool 23 and housed in the cartridge case 21. The film 25 is the same as the one shown in FIG. 3 ( Refer to Japanese Patent Application No. 63-57785).

When the cartridge 20 is loaded into a camera, the cover-opening mechanism of the camera engages the pair of projections 24a, 24b to lift them up. Since the cartridge 20 is fixedly loaded in the camera, as shown in FIG. 4, the flexible wall portion 22 is deformed upwardly to form an inlet opening 26 when the projections 24a, 24b are lifted up. Then, as the spool 23 is made to rotate in the film-feeding direction, the counterclockwise direction in the case of FIG. 4, the film 25 is fed out through the inlet opening 26 since the film 25 is tightly wound around the spool 23. Thus, the film 25 is led to a position to be exposed in the camera.

A magnetic tape 27 serving as the magnetic data-input means is attached to an outer surface of the cartridge case 21. For instance, a commercially available magnetic tape may be used as the tape 27.

The data concerning sensitivity of the film is input in advance to the magnetic tape 27 and is read out by a suitable input-output mechanism (not shown) of the camera when the cartridge 20 is loaded into the camera. In addition, data concerning number of the exposed frames of the film is input to the tape 27 by the input-output mechanism of the camera when the cartridge 20 is taken out from the camera. This data enables the exposed frames of the film not to be re-exposed when the cartridge provided with this data is loaded into the camera. Furthermore, this data enables the unexposed frames of the film to be fed to the position to be exposed when the film loaded in the cartridge contains several exposed frames.

The magnetic tape 27 may be replaced with a EEPROM as the magnetic data-input means ( Refer to Japanese Patent Public Disclosure No. 62-116932). The EEPROM is provided with data such as the DX code, the consumption state of the film, photographing spot and so on. If data such as the conditions for making prints is input to the EEPROM at a laboratory, the data is available when second prints are made. In addition, such data as the number of second prints and conditions for trimming may be input to the EEPROM.

In this embodiment, a film may be used in which cellulose triacetate containing a magnetic material is used as a film base. In this arrangement, the printing conditions for each frame are input to the EEPROM.

As described above with respect to the preferred embodiment, according to the film cartridge of the invention which is provided with magnetic data-input means and/or electrical data-input means, various kinds of data can be input easily and definitely during the appropriate period.

While the present invention has been described in connection with preferred embodiments, it will be understood that it is not intended to limit the invention to these embodiments. On the contrary, it is intended that the present invention cover all alternatives, modifications, and equivalents as may be included within the spirit and scope of the invention as defined by the attached claims.

What is claimed is:

1. A method for recording data on a photographic apparatus, said apparatus comprising a film cartridge, a spool disposed in said cartridge and rotatable about a longitudinal axis, photographic film being wound into a roll around said spool, said film having first and second longitudinally extending edges defining therebetween a photosensitive region, said photosensitive region having a photosensitive emulsion thereon and being divided into at least first areas and second areas, each of said first areas having a size between 350 mm$^2$ and 1200 mm$^2$, and said second areas having a size which is at least 15% of each of said first areas, said second areas being provided proximate said longitudinally extending edges, a magnetic medium being formed in a layer on said film, said method comprising the steps of:

optically recording film data in said second area when the film is produced, said film data including at least optically readable data for identifying the photographic film;

photographically recording an image in said first areas;

optically recording photography data in said second area during photography, said photography data including at least optically readable data relating to conditions during exposure of said film;

magnetically recording additional data on said magnetic medium, said additional data relating to conditions for use in processing prints from said photographic film when said film is photo-processed.

2. A method as claimed in claim 1, wherein an end of said spool projects from said cartridge, said spool being rotated when said end is rotated.

3. A method as claimed in claim 1, wherein said cartridge has electrical data input means associated therewith in the form of a semiconductor element, said electrical data input means receiving at least print condition data after said film has been processed.

4. A method as claimed in claim 1, wherein said cartridge has magnetic data input means associated therewith.

5. A method as claimed in claim 1, wherein said additional data recorded on said magnetic medium includes data relating to at least one of color correction, trimming conditions, and print quality information.

6. A method as claimed in claim 1, wherein said second areas are disposed between perforations formed in said film.

7. A method as claimed in claim 6, wherein said optically recordable data is recorded in the form of a bar code.

8. A method for making prints from a photographic apparatus, said apparatus comprising a film cartridge, a spool disposed in said cartridge, photographic film wound in a roll around said spool, said film having first and second longitudinally extending edges defining therebetween a photosensitive region, said photosensitive region having a photosensitive emulsion thereon and being divided into at least first areas in which images are photographically recorded and second areas in which optically readable data for identifying the photographic film is optically recorded when said film is produced and optically readable data relating to conditions of exposure is optically recorded during photographing of said images, each of said first areas having a size between 350 mm$^2$ and 1200 mm$^2$, each of said second areas, said a size which is at least 15% of each of said first areas, said second areas being provided proximate said longitudinally extending edges, a magnetic medium being formed in a layer on said film, additional data relating to conditions for use in processing prints being magnetically recorded in said magnetic medium when said film is processed, said method comprising the steps of:

reading the data recorded in at least one of said second areas and said magnetic medium;

adjusting printing variables based upon said data; and photographically printing said images.

9. A method for making prints from a photographic apparatus, said apparatus comprising a film cartridge, a spool disposed in said cartridge, photographic film wound in a roll around said spool, said film having first and second longitudinally extending edges defining therebetween a photosensitive region, said photosensitive region having a photosensitive emulsion thereon and being divided into at least first areas in which images are photographically recorded and second areas in which optically readable data for identifying the photographic film is optically recorded when said film is produced and optically readable data relating to conditions of exposure is optically recorded during photographing of said images, each of said first areas having a size between 350 mm$^2$ and 1200 mm$^2$, each of said second areas having a size which is at least 15% of each of said first areas, said second areas being provided proximate said longitudinally extending edges, a magnetic medium being formed in a layer on said film, said method comprising the steps of:

magnetically recording additional data relating to conditions for use in processing prints in said magnetic medium;

reading the data received in at least one of said second areas and said magnetic medium;

adjusting printing variables based upon said data; and photographically printing said images.

10. A method as claimed in claim 9 wherein said magnetically readable data is also recorded in said second areas.

11. A method for recording data on a photographic apparatus, said apparatus comprising a film cartridge, a spool carried by said cartridge and rotatable about a longitudinal axis, photographic film wound into a roll around said spool, said film having first and second longitudinally extending edges defining therebetween a photosensitive region, said photosensitive region having a photosensitive emulsion thereon and being divided into at least first areas and second areas, each of said first areas having a size between 350 mm$^2$ and 1200 mm$^2$, and said second areas having a size which is at least 15% of each of said first areas, said second areas being provided proximate said longitudinally extending edges, a magnetic medium being formed in a layer on said film, said method comprising the steps of:

optically recording film data in said second area when the film is produced, said film data including at least optically readable data for identifying the photographic film;

optically recording photography data in said second area during photogtraphy, said photography data including at least optically readable data relating to conditions during exposure of said film;

magnetically recording additional data on said magnetic medium, said additional data relating to conditions for use in processing prints from said photographic film when said film is photo-processed.

12. A method as claimed in claim 11, wherein said optically readable data is recorded by virtue of a plurality of optical sources each omitting a different color of light.

* * * * *